United States Patent
Kakiuchi (10) Patent No.: US 8,159,170 B2
(45) Date of Patent: Apr. 17, 2012

(54) INTEGRAL TYPE AIR CONDITIONER

(75) Inventor: Atsushi Kakiuchi, Yao (JP)

(73) Assignee: Sharp Kabushiki Kaisha, Osaka (JP)

( * ) Notice: Subject to any disclaimer, the term of this patent is extended or adjusted under 35 U.S.C. 154(b) by 537 days.

(21) Appl. No.: 12/360,997

(22) Filed: Jan. 28, 2009

(65) Prior Publication Data

US 2009/0243527 A1    Oct. 1, 2009

(30) Foreign Application Priority Data

Mar. 26, 2008 (JP) ................................. 2008-081375

(51) Int. Cl.
*H02K 17/32* (2006.01)

(52) U.S. Cl. ................... 318/434; 318/400.22; 318/717; 318/719; 388/800; 388/806; 388/903; 62/498; 62/310; 62/228.4; 62/187; 62/89; 454/228

(58) Field of Classification Search .......... 318/432–434, 318/717, 719, 400.22; 388/800, 806, 903; 62/498, 310, 228.4, 187, 183, 180, 126, 89; 414/4, 199.1; 454/228

See application file for complete search history.

(56) References Cited

U.S. PATENT DOCUMENTS

| | | | | |
|---|---|---|---|---|
| 6,006,530 A | * | 12/1999 | Lee et al. .......................... | 62/187 |
| 6,065,298 A | * | 5/2000 | Fujimoto .......................... | 62/230 |
| 2003/0228229 A1 | * | 12/2003 | Yoshimura et al. .......... | 417/199.1 |
| 2005/0183434 A1 | * | 8/2005 | Iritani et al. .................. | 62/228.1 |
| 2006/0112702 A1 | * | 6/2006 | Martin et al. .................. | 62/180 |
| 2010/0139312 A1 | * | 6/2010 | Takegami et al. ............... | 62/498 |

FOREIGN PATENT DOCUMENTS

| | | | |
|---|---|---|---|
| JP | 63-117692 A | | 7/1988 |
| JP | 3-1033 A | | 1/1991 |
| JP | 3-1034 A | | 1/1991 |
| JP | 4-60334 A | | 2/1992 |
| JP | 2002106924 A | * | 2/1992 |
| JP | 5-256472 A | | 10/1993 |
| JP | 6-117708 A | | 4/1994 |
| JP | 2001-178173 A | | 6/2001 |
| JP | 2002-106924 A | | 4/2002 |
| JP | 2006-234249 A | | 9/2006 |
| JP | 2006-234285 A | | 9/2006 |
| JP | 2006234285 A | * | 9/2006 |

* cited by examiner

*Primary Examiner* — Walter Benson
*Assistant Examiner* — Jorge Carrasquillo
(74) *Attorney, Agent, or Firm* — Birch, Stewart, Kolasch & Birch, LLP (57) ABSTRACT

When cooling operation or dehumidifying operation is started, a blower fan for an evaporator and an exhaust fan for a condenser are driven at an initial rotational number. A compressor is driven at a fixed rotational number. Due to load variation, an operating current supplied from a power source is changed. When the operating current exceeds a reference value, the rotational number of the blower fan is gradually reduced. When an endothermic quantity by the evaporator decreases, a temperature of a gas refrigerant flowing through the evaporator is lowered. Since the load applied on the compressor is reduced, the operating current decreases. In this way, when the compressor is loaded, the operating current increased, however, by controlling operation of the fans as described above, it is possible to prevent that the power source is shut off due to overcurrent and operation is stopped.

19 Claims, 7 Drawing Sheets

INITIAL ROTATIONAL NUMBER

FIG. 8

WITHIN FIXED TIME PERIOD FROM START OF OPERATION

AFTER FIXED TIME PERIOD HAS ELAPSED FROM START OF OPERATION

FIG. 9

INTEGRAL TYPE AIR CONDITIONER

BACKGROUND OF THE INVENTION

1. Field of the Invention

The present invention relates to an integral type air conditioner that exhausts exhaust heat generated by heat exchanging to the outside using a duct and blows cooled air into a room.

2. Description of the Related Art

An integral type air conditioner is generally incorporated with a compressor, an evaporator, a condenser, a fan for the evaporator, and a fan for the condenser, in a main body thereof. As an example of such an integral type air conditioner, Japanese Patent Laid-Open No. 5-256472 discloses an integral type air conditioner including an exhaust duct. When cooling operation is carried out, indoor air is taken in and this air cools the condenser. High-temperature air is exhausted to the outside through the duct. In addition, the indoor air that has been taken in is cooled down by the evaporator and then blown into the room as cool air. By cooling the indoor air, drain water is generated. This drain water is poured to the condenser to be evaporated so that the drain water is disposed of.

Japanese Patent Laid-Open No. 2006-234249 describes an integral type air conditioner in which a temperature of a condenser is detected and the rotation of an exhaust fan is controlled to improve efficiency of a refrigerating cycle.

In the beginning of cooling operation or dehumidifying operation, collected drain water is too less to be poured to the condenser. Moreover, also in the case of low humidity, less quantity of drain water is generated. The refrigerant passing through the condenser is not cooled completely, thus decreasing efficiency of a refrigerating cycle. Therefore, the load applied on the compressor increases and operating current supplied at the time of operation increases. The increase in the operating current causes overcurrent. Then, a protection circuit is operated to shut off the power supply and stop the operation. In addition, when there is provided a thermal relay to prevent the burning of a motor due to overcurrent flowing through the motor as the load increases, the thermal relay is operated to stop the compressor for protection. In this case, it requires several ten minutes to recover the thermal relay. During this time, cooling operation or dehumidifying operation can not be carried out.

Hence, driving of the exhaust fan for the condenser is controlled depending on a temperature of the condenser. However, since the maximum rotational number of the exhaust fan is limited, efficiency of a refrigerating cycle is not improved sufficiently. As a result, the overload on the compressor cannot be necessarily eliminated and there remains a risk that a circuit breaker is blown and the power supply is thereby shut off. Further, there is also a risk that the thermal relay for protecting the compressor is operated.

In view of the above described circumstance, it is an object of the present invention to provide an integral type air conditioner that prevents stop of operation because of overcurrent so that cooling or dehumidifying operation can be continuously carried out.

SUMMARY OF THE INVENTION

The present invention provides an integral type air conditioner including, in a cabinet, a compressor, a condenser and an evaporator, for exhausting exhaust heat generated from the condenser by an exhaust fan through a duct to outside and blowing air to the evaporator by a blower fan to blow generated cool air into a room during cooling operation, wherein a current detector for detecting an operating current supplied during operation and a control device for controlling the compressor, the exhaust fan and the blower fan are provided. The control device controls rotation of the exhaust fan or the blower fan depending on detected operating current so as not to cause overcurrent during cooling operation or dehumidifying operation.

When operation is started, the compressor, the exhaust fan and the blower fan are driven. The compressor is driven at a fixed rotational number. The current detector detects the operating current supplied from a power source. In the beginning of start of operation, the compressor is loaded. Since the rotational number of the compressor is maintained fixed, the operating current increases. When the operating current exceeds a reference value, the control device increases the rotational number of the exhaust fan or reduces the rotational number of the blower fan. As a result, the load applied on the compressor is reduced to thereby decrease the operating current.

When the operating current exceeds a reference value, the control device increases the rotational number of the exhaust fan, and when the rotational number of the exhaust fan reaches the set maximum rotational number, reducing the rotational number of the blower fan. Alternatively, the control device performs either one of operations of increasing the rotational number of the exhaust fan or reducing the rotational number of the blower fan. The control for the exhaust fan and the blower fan in combination is effective to decrease the operating current, when it is impossible to correspond to current increase only by either one of the operations.

The control device changes an amount of change in the rotational number of the exhaust fan or the blower fan in a stepwise manner depending on change (increasing degree) in the operating current with respect to a normal operating current. When the operating current exceeds a reference value, the increasing number in the rotational number of the exhaust fan is changed in a stepwise manner, or the decreasing number in the rotational number of the blower fan is changed in a stepwise manner. For example, when the change in the operating current is small, the increasing number in the rotational number of the exhaust fan or the decreasing number in the rotational number of the blower fan is reduced. When the change in the operating current is significant, the increasing number in the rotational number of the exhaust fan, or the decreasing number in the rotational number of the blower fan is increased. That is, since the operating current is a high current when the change is significant, overcurrent is caused unless the operating current is decreased. At this time, by significantly increasing the rotational number of the blower fan, or by significantly increasing the rotational number of the exhaust fan, it is possible to promptly reduce the operating current.

A reference value in ascending change of the operating current is set higher than a reference value in descending change of the operating current. When the operating current exceeds a reference value, rotation of the exhaust fan or the blower fan is controlled so that the operating current decreases. At this time, since the former reference value is higher than the latter reference value, the operating current is less likely to exceed the former reference value even if the operating current varies during decrease in the operating current. As a result, it is possible to prevent that the rotational number of each fan is controlled to be increased/reduced, thus making it possible to stabilize operation.

The control device increases change in the rotational number as the operating current is higher. When the operating current is high, the rotational number of the blower fan is significantly reduced, or the rotational number of the exhaust fan is significantly increased. As a result, it is possible to promptly decrease the operating current to thereby prevent overcurrent.

A reference value until a fixed time has elapsed from start of operation is set lower than a reference value after the fixed time has elapsed. The compressor is likely to be loaded right after operation is started. In the beginning of start of operation until a fixed time has elapsed, by controlling rotation of the fan based on a low reference value, it is possible to deal with the increase in the operating current in an early stage.

According to the present invention, in the integral type air conditioner, when the operating current increases during cooling operation or dehumidifying operation, by controlling rotation of the exhaust fan or the blower fan, actions on the evaporator and the condenser are made high to thereby reduce the load applied on the compressor and to prevent overcurrent. As a result, it is possible to prevent that, for example, due to tripping of a circuit breaker, power supply is shut off to stop the operation, and that the thermal relay for the compressor is operated to stop the compressor for protection. This makes it possible to perform continuous operation.

DESCRIPTION OF THE PREFERRED EMBODIMENTS

Figure 1:
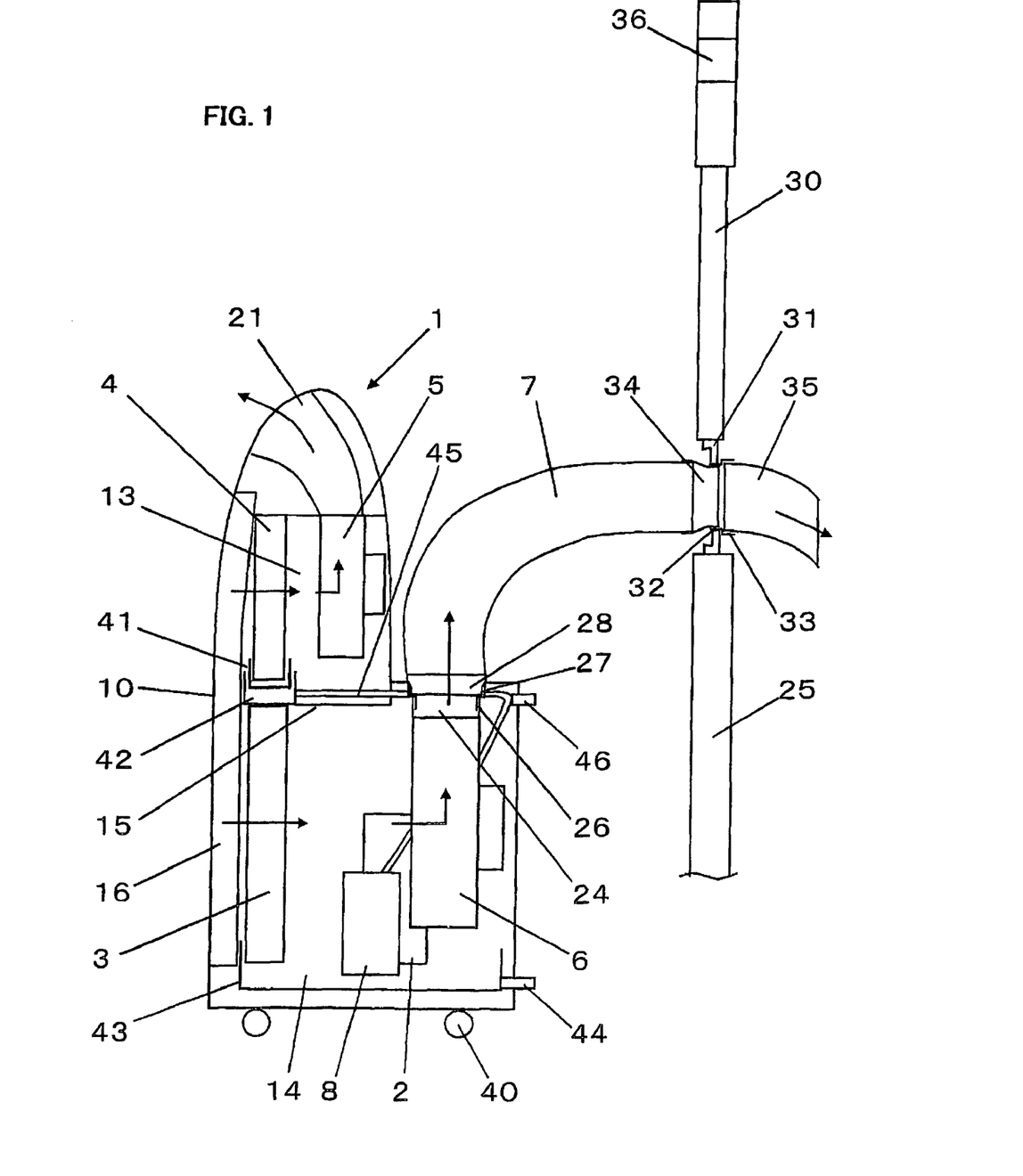
FIG. 1 is an overall structural view of an integral type air conditioner of the present invention.
Figure 2:
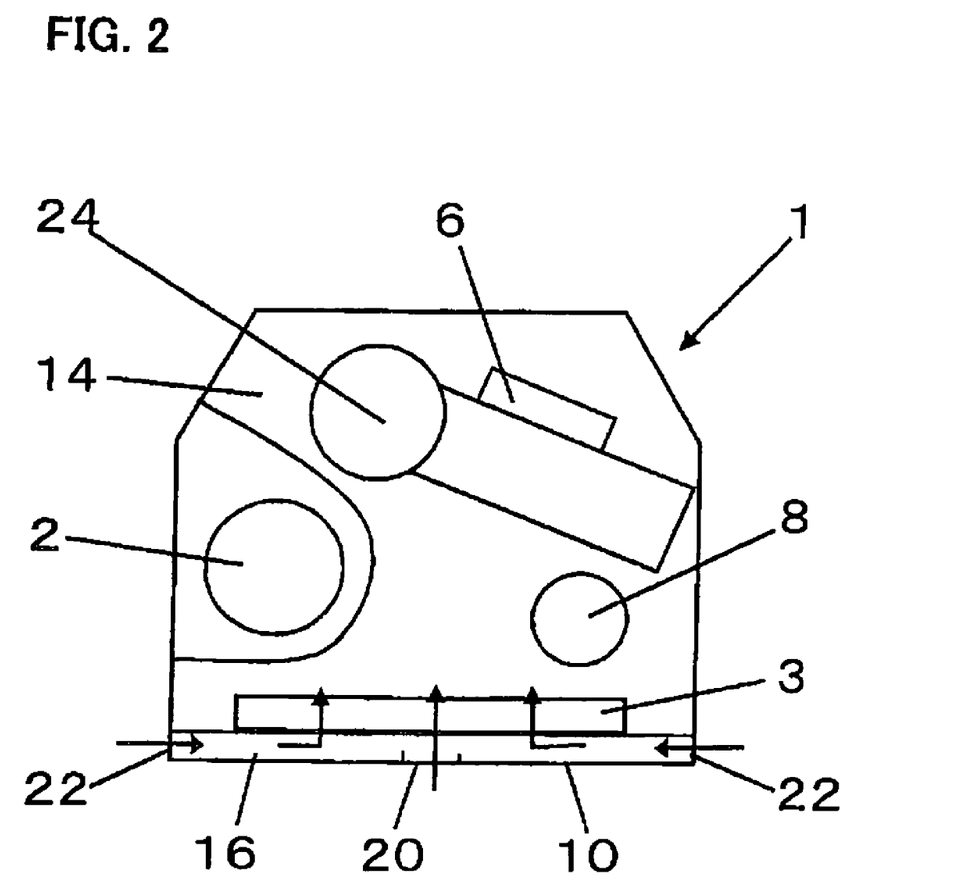
FIG. 2 is a view showing arrangement inside an exhaust heat chamber of the integral type air conditioner.

As shown in FIGS. 1 and 2, an integral type air conditioner of the present embodiment is incorporated with, in a cabinet 1, a compressor 2, a condenser 3, an evaporator 4, and a restriction mechanism (not shown), which form a refrigerating cycle. In addition, the air conditioner generates cold air to perform cooling operation for cooling a room. Therefore, the air conditioner includes a blower fan 5 for the evaporator 4, an exhaust fan 6 for the condenser 3, an exhaust duct 7, and a pump 8 for disposing of drain water generated by cooling operation.

Figure 3:
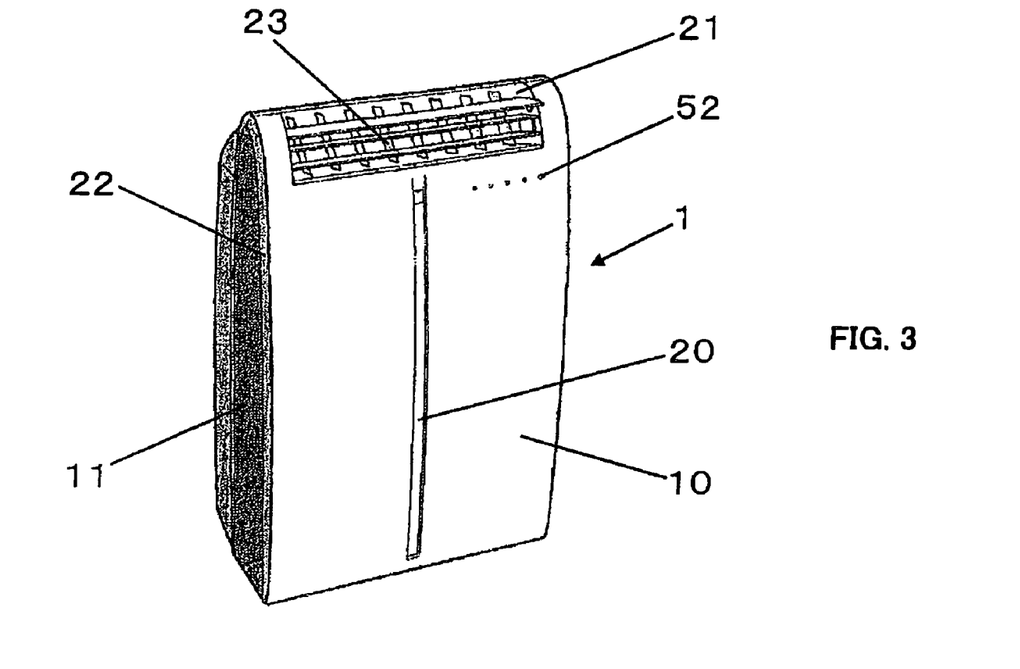
FIG. 3 is an external perspective view of the air conditioner when viewed from the front side.
Figure 4:
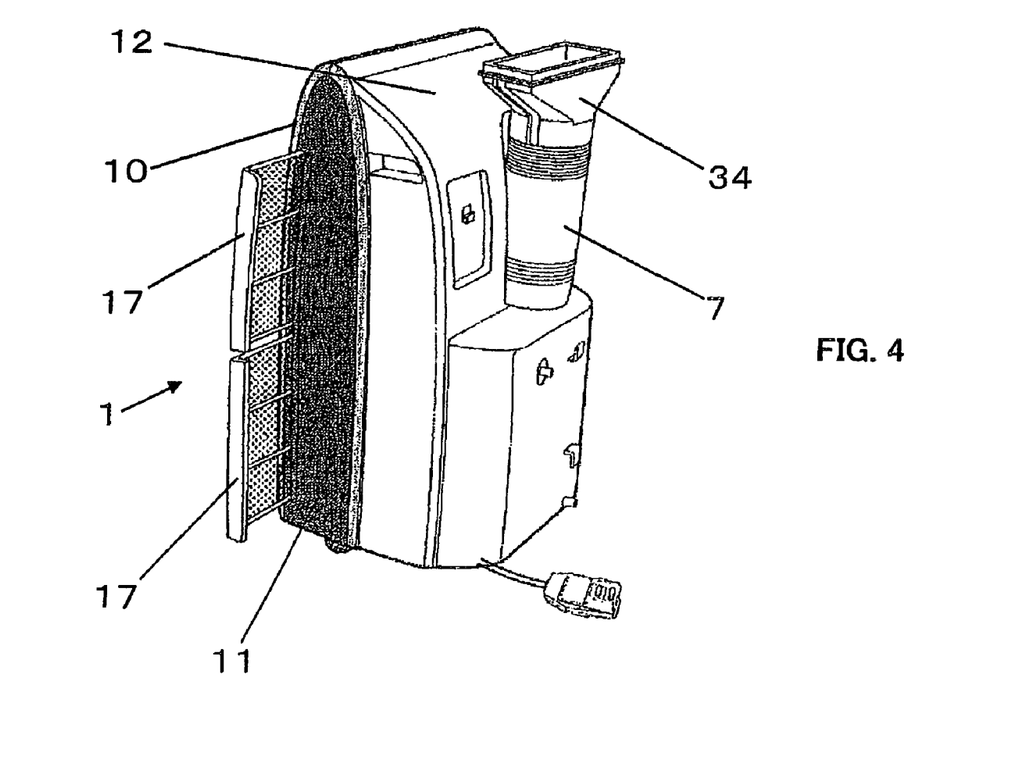
FIG. 4 is an external perspective view of the air conditioner when viewed from the rear side.

As shown in FIGS. 3 and 4, the cabinet 1 is configured so as to be surrounded by a front panel 10, a pair of left and right side panels 11, and a back panel 12. Moreover, the cabinet 1 is divided into an upper cooling chamber 13 and a lower exhaust heat chamber 14. The cooling chamber 13 and the exhaust heat chamber 14 are partitioned by a partition plate 15 so that upper and lower spaces are heat-insulated.

The cooling chamber 13 houses the evaporator 4 and the blower fan 5, and the exhaust heat chamber 14 houses the compressor 2, the condenser 3, the exhaust fan 6, and the pump 8. The cooling chamber 13 is disposed with the evaporator 4 at the front side and the blower fan 5 composed of a sirocco fan at the rear side. The exhaust heat-chamber 14 is disposed with the condenser 3 at the front side and the exhaust fan 6 composed of a sirocco fan at the rear side. The compressor 2 and the pump 8 are disposed at each of left and right sides between the condenser 3 and the exhaust fan 6. The condenser 3 is arranged under the evaporator 4 so that the evaporator 4 and the condenser 3 are arranged one above the other.

The cabinet 1 has an opening at the front side and this opening is covered by the front panel 1. The evaporator 4 and the condenser 3 face the opening and there is formed a gap 16 between the front panel 10, the evaporator 4 and the condenser 3. A filter 17 is detachably mounted to this gap 16.

The front panel 10 is formed with a front suction port 20 and a blow-out port 21. Moreover, side suction ports 22 are formed between the front panel 10 and the side panels 11. The front suction port 20 is positioned at a center of the front panel 10 and is arranged in a vertical direction. The front suction port 20 and the side suction ports 22 are communicated with the gap 16. The blow-out port 21 is arranged in an upper part of the front panel 10 and is opened obliquely upward from a horizontal direction. The blow-out port 21 is provided with a louver 23 and this louver 23 is swung by a motor. The blow-out port 21 is communicated with the cooling chamber 13, thus forming a ventilation passage which extends from the front suction port 20 and the side suction ports 22 to the blow-out port 21 via the evaporator 4. This realizes suction from the front of the cabinet 1 and blow-out to frontward.

The exhaust heat chamber 14 protrudes toward the rear side than the cooling chamber 13 and is formed with an exhaust port 24 at an upper face of the exhaust heat chamber 14. One end of the bellows-like duct 7 is attached to the exhaust port 24, and the other end of the duct 7 is attached to an opening on a wall 25 so that the exhaust heat chamber 14 communicates with outside through the duct 7. Thus, in the exhaust heat chamber 14, an ventilation passage which extends from the front suction port 20 and the side suction ports 22 to the exhaust port 24 via the condenser 3 is formed. This ventilation passage is communicated with the duct 7 so as to connect to the outside.

The one end of the duct 7 is rotatable and detachable with respect to the exhaust port 24. That is, a fan guard 27 is rotatably fitted into the exhaust port 24b formed in a casing 26 of the exhaust fan 6. A duct connecter 28 is provided at the one end of the duct 7. This duct connecter 28 is detachably mounted to the fun guard 27, while the duct connecter 28 is attached so as not to be rotated with respect to the fun guard 27. When the duct 7 and the fun guard 27 are rotated integrally, the duct 7 and the cabinet are rotated relatively.

The other end of the duct 7 is detachably attached to the opening on the wall 25. That is, with a window 30 of the opening, a mounting panel 31 for attaching the duct 7 is fixed to a window frame. The window 30 may be any one of a double hung window and a double sliding window, and a length of the mounting panel 31 is variable in accordance with a size of the window 30.

A duct holder 33 is fitted into a mounting port 32 of the mounting panel 31 so that the duct connecter 34 provided in the other end of the duct 7 is detachably mounted to the duct holder 33. By mounting the duct connecter 34 to the duct holder 33, the duct holder 33 is attached so as not to drop out of the duct holder 33. In the outdoor side of the duct holder 33, a rain shelter 35 is attached so that rain is prevented from entering. Hence, by removing the duct connecter 34 from the duct holder 33, it is possible to remove the duct 7 from the window 30 and further to remove the duct holder 33 from the mounting panel 31. At this time, when the duct 7 is removed, the mounting port 32 of the mounting panel 31 is kept opened, and therefore a cover is provided in the mounting panel 31 to cover the mounting port 32. Note that, in FIG. 1, 36 denotes a vent hole, to which a ventilating fan is attachable.

Moreover, wheels 40 are attached to a bottom of the cabinet 1. Thus, the present air conditioner is movable and can be moved in a room with the extensible duct 7 attached thereto. In addition, by removing the duct 7, the air conditioner can be carried to another room and can be used in a selective place.

Meanwhile, when carrying out heat exchanging of indoor air, moisture in the air is condensed to thereby generate drain water in the evaporator 4. A drain pan 41 for receiving drain water is provided below the evaporator 4 and a drop tray 42 is provided below the drain pan 41. The drain pan 41 is housed in the drop tray 42 and the drop tray 42 is attached to the cabinet 1. The drain water dropped to the drain pan 41 flows down to the drop tray 42 and further drops down from the drop tray 42 to the condenser 3. When passing through the condenser 3, the drain water evaporates while cooling the condenser 3. A drain receiving tray 43 is provided below the condenser 3 and the drain water flowing along the condenser 3 is stored in the drain receiving tray 43. The drain receiving pan 43 is placed on a bottom of the exhaust heat chamber 14 and is formed with a drain hole 44 on which a plug is put. When the plug is pulled out, the drain water is discharged.

In addition, in order to dispose of the drain water stored in the drain receiving tray 43, the drain water is guided to the condenser 3 by the pump 8 again and then evaporated. The pump 8 is disposed within the drain receiving tray 43, and a drain hose 45 is connected to the pump 8 and the drain hose 44 is connected to the drop tray 42. The pump 8 and the drop tray 42 form a water feeding section.

The pump 8 sucks the drain water to send it to the drop tray 42. The drain water flows down from the drop tray 42 and evaporates by a heat from the condenser 3. In this way, by circulating the drain water, it is possible to disposed of the drain water in the inside without discharging to outside. Note that, in the middle of the drain hose 45, a cock for switching a flow passage is provided and a drain pipe 46 is connected thereto. By turning the cock, a flow passage to circulate toward the drop tray 42 and a flow passage to discharge toward the drain pipe 46 are switched.

Figure 5:
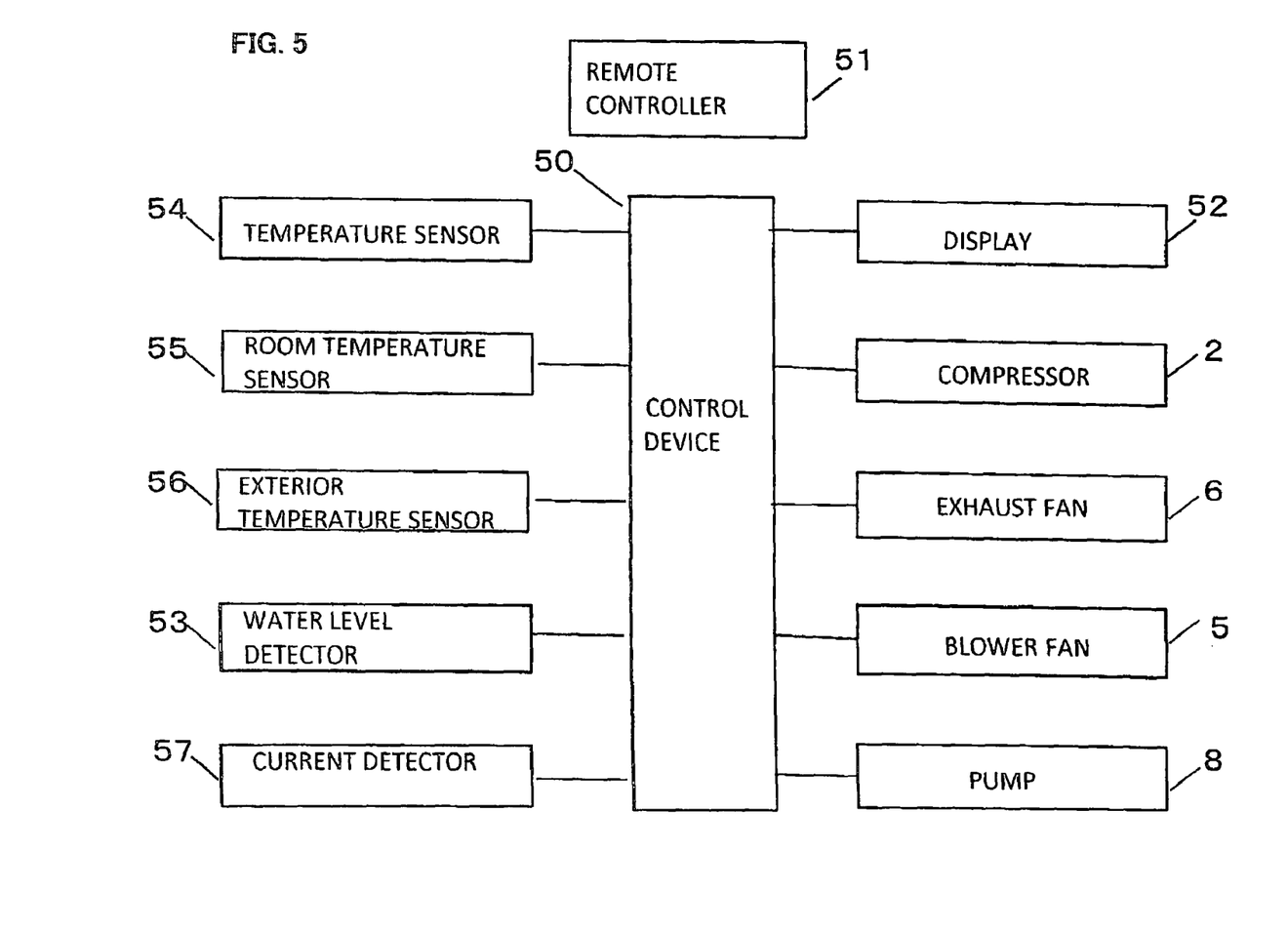
FIG. 5 is a control block diagram of the air conditioner.

As shown in FIG. 5, the air conditioner includes the compressor 2, the blower fan 5, the exhaust fan 6, and a control device 50 for controlling driving of the pump 8. The control device 50 composed of a micro computer is incorporated in the cabinet 1 and executes various types of operation such as cooling operation, dehumidifying operation and ventilation operation depending on operation signal from a remote controller 51 or an operation switch provided in the cabinet. Further, the front panel 10 is provided with a display 52 composed of an LED and the like so that the control device 50 controls illumination of the display 52 depending on each type of operation, and controls illumination or blinking of the display 52 as warning when the drain water becomes full.

In cooling operation, indoor air is sucked in from the front suction port 20 and the side suction ports 22 by driving of the blower fan 5, and passes through the evaporator 4 from the gap 16 of the front panel 10. At this time, the sucked-in air is cooled by the evaporator 4 to become cold air. The cold air is blown out from the blow-out port 21 into the room.

On the other hand, indoor air is sucked in from the front suction port 20 and the side suction ports 22 by driving of the exhaust fan 6, and passes through the condenser 3 from the gap 16 of the front panel 10. At this time, the sucked-in air is warmed by the condenser 3 to become warm air. The warm air passes through the duct 7 from the exhaust port 24 to be exhausted outside.

The drain water generated from the evaporator 4 in cooling operation flows down to be stored in the drain receiving tray 43. When the stored drain water reaches to a predetermined water level, the pump 8 is driven to pump up the drain water in the drain receiving tray 43, and leads to the drop tray 42. The pumped-up drain water flows down along the surface of the condenser 3 to evaporate. The drain water that does not evaporate is stored in the drain receiving tray 43, and pumped up again to circulate until being evaporated. Note that, the water level of the drain water in the drain receiving tray 43 is detected by a water level detector 53. When the water level detector 53 detects that the drain water in the drain receiving tray 43 is stored to a predetermined level, the control device 50 starts driving of the pump 8. When detecting fully filled water, the control device 50 stops the compressor 2, the pump 8 and the like to stop cooling operation.

In dehumidifying operation, similarly to cooling operation, driving of the compressor 2, the blower fan 5, the exhaust fan 6, and the pump 8 are controlled. However, the drain water stored in the drain receiving tray 43 is not circulated, but discharged through the drain pipe 46 by operating the cock. In this case, the duct 7 is kept detached. The dehumidified air after passing through the exhaust heat chamber 14 is exhausted from the exhaust port 24 into a room. Thus, it is possible to dehumidify without changing a room temperature.

In ventilation operation, the compressor 2, the blower fan 5 and the pump 8 are stopped and only the exhaust fan 6 is driven. The indoor air sucked-in from the front side of the cabinet 1 is exhausted to outside from the exhaust heat chamber 14 through the duct 7. At this time, the outside air is taken in from the ventilation hole 36 of the wall 25 and a gap in the room so that ventilation of the indoor air is carried out.

The air conditioner includes a temperature sensor 54 for detecting a temperature of the condenser 3, a room temperature sensor 55 for detecting a room temperature, and an exterior temperature sensor 56 for detecting an outside temperature. The temperature sensor 54 is disposed in contact with or in proximity to the surface of the condenser 3, and detects a temperature of the condenser whose temperature corresponds to a temperature of a refrigerant flowing through the condenser 3. The room temperature sensor 55 is disposed in proximity to the front suction port 20 or the side suction ports 22 in the cabinet 1. The exterior temperature sensor 56 is disposed on the outside of the mounting panel 31, and is connected to the control device 50 by a cable laid along the duct 7.

In cooling operation or dehumidifying operation, the control device 50 determines, based on a room temperature, the initial rotational number of the exhaust fan 6 and the blower fan 5 at the start of the operation. Alternatively, the initial rotational number may be determined based on a room temperature set by a remote controller.

The control device 50 controls driving of a driving motor to operate the compressor 2 in cooling operation or dehumidifying operation. The driving motor is a motor whose rotational number is determined by power source voltage or power source frequency, where inverter control is not performed. Therefore, the compressor 2 keeps the constant rotational number (a constant speed) during operation. A driving current is supplied from the power source through a driving circuit to the compressor 2 to operate the driving motor. When the compressor 2 is overloaded, the overcurrent having its acceptable limit value or more flows therethrough. In such a case, a protection circuit is operated, or by tripping of a circuit breaker or the like, power supply is shut off to stop the operation. For example, when there is provided a thermal relay to prevent burning of a motor due to the overcurrent flowing through the motor, the thermal relay is operated to stop the compressor 2 for protection purpose. Thereby, the compressor 2 can be protected from damage.

Meanwhile, when the load is applied on the compressor 2, an operating current supplied from the power source increases. Especially, in the beginning of cooling operation or dehumidifying operation, or when humidity is low, the drain water is too less to carry out cooling of the condenser 3 sufficiently, thus the temperature of a refrigerant is not lowered. Thereby, the compressor 2 is so loaded that the operating current increases prominently to maintain constant rotation of the compressor 2. As a result, it is more likely that the circuit breaker or the thermal relay operates. Especially, when the thermal relay starts operating to stop the compressor 2 for protection, it takes several minutes to recover the thermal relay. During this time, cooling operation or dehumidifying operation can not be carried out, which results in inconvenience.

Hence, a current detector 57 for detecting an operating current supplied from the power source at the time of operation is provided. The current detector 57 may be a known one, which detects an input current to the driving circuit, for example, using a current trance. Alternatively, the current detector 57 may detect a driving current flowing through the compressor 2.

In addition, the control device 50 controls rotation of the exhaust fan 6 and the blower fan 5 corresponding to the detected operating current, in order to prevent overcurrent and to carry out continuous operation during cooling operation or dehumidifying operation.

In a first embodiment of the control, the control device 50 controls rotation of the blowing fan based on the detected operating current. That is, the control device 50 reduces the rotational number of the blower fan 5, when the detected operating current exceeds a reference value during operation.

Figure 6:
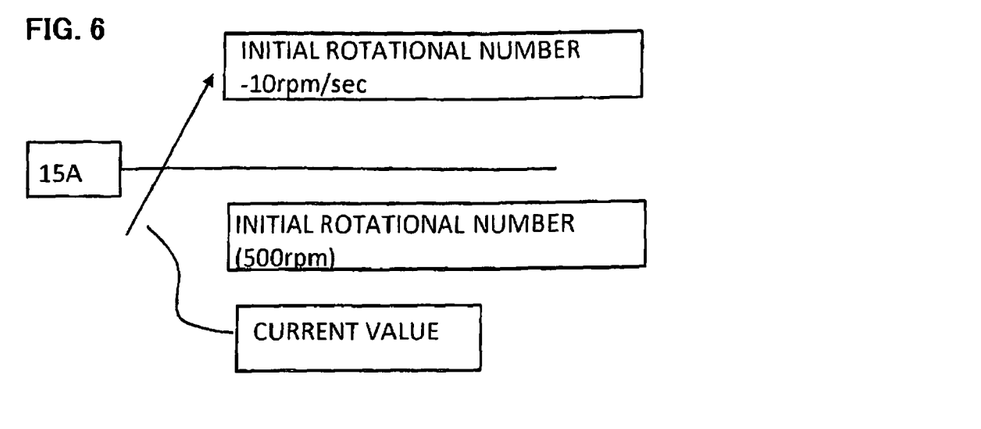
FIG. 6 is a view showing change in the rotational number of a blower fan, when an operating current exceeds a reference value.

When operation is started, the control device 50 determines the initial rotational number of the blower fan 5 and the exhaust fan 6 based on a room temperature. The initial rotational number is set, for example, at 500 rpm. During operation, the current detector 57 detects the operating current. As shown in FIG. 6, when the operating current exceeds a reference value, for example, 15 A, the control device 50 controls the blower fan 5 to reduce the rotational number of the blower fan 5. The rotational number of the blower fan 5 is reduced at a fixed rate. For example, the number is lowered at a rate of 10 rotations per second. Meanwhile, the rotational number of the exhaust fan 6 is not changed.

While the operating current is higher than the reference value, the rotational number of the blower fan 5 is gradually reduced. A lower-limit is set for the rotational number of the blower fan 5. For example, the lower-limit rotational number is set at 100 rpm. The control device 50 reduces the rotational number of the blower fan 5 until reaching the lower-limit rotational number.

By decreasing the rotational number of the blower fan 5, the quantity of air that is sucked from the room and passes through the evaporator 4 is reduced. Thereby, an endothermic amount of the evaporator 4 is reduced to thereby lower a temperature of a gas refrigerant flowing through the evaporator 4. Since the low-temperature gas refrigerant flows into the compressor 2, the load applied on the compressor 2 decreases. As a result, as the driving current of the blower fan 5 decreases, the driving current of the compressor 2 also decreases, and thus a total operating current to be supplied is reduced.

As the rotational number of the blower fan 5 is reduced gradually, the operating current decreases. When the operating current reaches the reference value or below, the control device 50 returns the rotational number of the blower fan 5 to the initial rotational number. At this time, when the rotational number is returned at once, for example, from 100 rpm to 500 rpm, there is a risk of generating noise. Hence, the control device 50 increases the rotational number gradually so that the rotation of the blower fan 5 changes linearly. The rotational number is increased, for example, by 2 rpm per second to reach the initial rotational number of 500 rpm.

Instead of controlling the rotation of the blower fan 5, the rotation of the exhaust fan 6 may be controlled. The control device 50 increases the rotational number of the exhaust fan 6, when the operating current exceeds the reference value during operation.

When operation is started, the exhaust fan 6 is driven at a determined initial rotational number, for example, 500 rpm. During operation, the current detector 57 detects an operating current supplied from the power source. When the operating current exceeds a reference value, for example, 15 A, the control device 50 controls the exhaust fan 6 to increase the rotational number of the exhaust fan 6. The rotational number of the exhaust fan 6 is increased at a fixed rate. For example, the number is increased at a rate of 10 rotations per second. Meanwhile, the rotational number of the blower fan 5 is not changed.

The rotational number of the exhaust fan 6 increases gradually with elapse of time. An upper limit is set for the rotational number of the exhaust fan 6. For example, the upper-limit rotational number is set at 1000 rpm. The control device 50 increases the rotational number of the exhaust fan 6 until reaching the upper-limit rotational number.

By increasing the rotational number of the exhaust fan 6, the quantity of air that is sucked from a room and passes through the condenser 3 increases. A heat radiation quantity of the condenser 3 increases so that a temperature of a liquid refrigerant from the condenser 3 is lowered. The temperature of the refrigerant flowing through the evaporator 4 is lowered so that the low temperature gas refrigerant flows into the compressor 2. Thereby, the load applied on the compressor 2 decreases gradually and the driving current of the compressor 2 also decreases, thus a total operating current to be supplied is reduced.

As the rotational number of the exhaust fan 6 is increased gradually, the operating current decreases. When the operating current reaches the reference value or below, the control device 50 returns the rotational number of the exhaust fan 6 to the initial rotational number. At this time, in order to prevent noise caused by sudden change in the rotational number, the control device 50 reduces the rotational number gradually so that the rotation of the exhaust fan 6 changes linearly. The rotational number is reduced, for example, by 2 rpm per second to the initial rotational number of 500 rpm.

Meanwhile, in cooling operation or dehumidifying operation, in order to exhaust efficiently, generally, there is a case where the exhaust fan 6 is driven at the maximum rotational number. Hence, the control device 50 performs control of the exhaust fan 6 and control of the blower fan 5 in combination.

That is, when the operating current exceeds the reference value, firstly the rotational number of the exhaust fan 6 is increased. When the rotational number of the exhaust fan 6 reaches the maximum rotational number, the rotational number of the blower fan 5 is reduced. Thereby, while carrying out cooling or dehumidifying operation efficiently, the operating current can be decreased.

As described above, when the compressor 2 is loaded and the operating current increases, the operating current can be decreased while continuing operation. Therefore, overcurrent is prevented and operation of a protection circuit can be avoided. For example, operation of the thermal relay to protect the compressor can be avoided. Such avoidance makes it possible to carry out continuous operation without stopping the operation. Especially, like in the beginning of the operation or in the operation when humidity is low, even if cooling effect for the condenser 3 by drain water can not be obtained and the compressor 2 is loaded, it is possible to prevent overcurrent of the operating current so as to carry out continuous operation. In addition, since the control is performed based on the operating current, even if power source voltage varies, the optimized continuous operation corresponding to the voltage can be carried out.

In the above-described embodiment, when the operating current exceeds the reference value, the rotation of each of the fans 5 and 6 is controlled regardless of a current value. In a second embodiment, the rotation of the blower fan 5 and the exhaust fan 6 is controlled depending on the current value. When the operating current exceeds the reference value, the control device 50 controls the rotation of the exhaust fan 6 and the blower fan 5 in a stepwise manner in accordance with change in the operation current.

Figure 7:
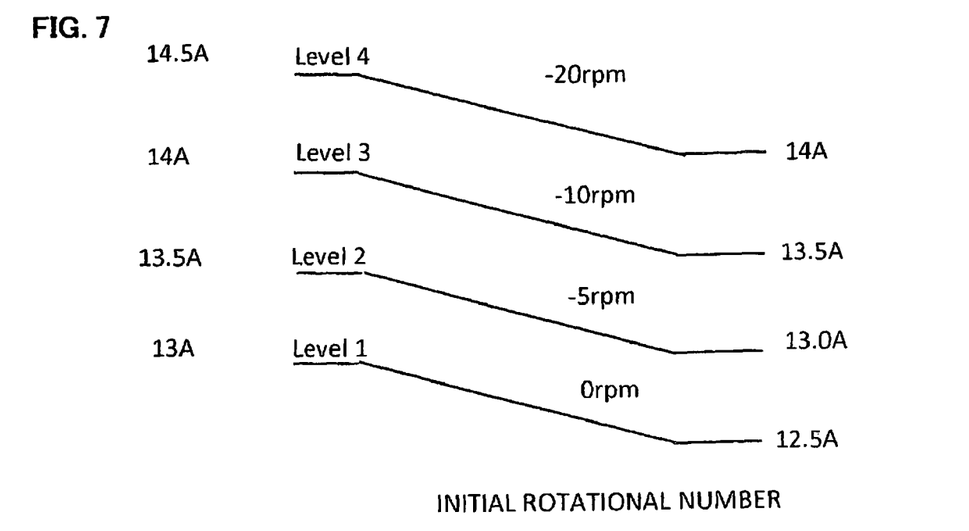
FIG. 7 is a view showing a relation between a plurality of reference values and a degree of change in the rotational number, when rotation of the blower fan is changed in a stepwise manner.

As shown in FIG. 7, a plurality of reference values are set depending on the current value. The reference value has hysteresis, and the reference value when the operating current changes to increase is different from that when the operating current changes to decrease. The former reference value is set higher than the latter reference value. The control device 50 reduces the rotational number of the blower fan 5, or increases the rotational number of the exhaust fan 6, in each level of the reference values. The increasing/decreasing number for a unit of time, in the present embodiment, the increasing/decreasing number per second, is different in each level, and the higher the operating current is, the greater the decrease in the rotational number of the blower fan 5 or the increase in the rotational number in the exhaust fan 6 is. The lower the operating current is, the smaller the decrease in the rotational number of the blower fan 5 or the increase in the rotational number of the exhaust fan 6 is.

Specifically, the rotational number of the blower fan 5 is set to be reduced from level 1 to level 4 in a stepwise manner, depending on the detected operating current, by the control device 50. Furthermore, threshold values in level 1 to level 4 are set based on a certain reference value. When the operating current becomes high, the control device 50 reduces the rotational number by a fixed amount depending on each level. When the operating current becomes low, the rotational number is reduced by the fixed amount depending on each level. Note that, the exhaust fan 6 is controlled to keep the constant rotational number.

When cooling operation or dehumidifying operation is started, the blower fan 5 and the exhaust fan 6 rotates at an initial rotational number, for example, 500 rpm. When the operating current exceeds a reference value of 13 A to reach level 1, the control device 50 keeps the current rotational number of the blower fan 5. When the operating current exceeds a reference value of 13.5 A to reach level 2, the control device 50 decrease the rotational number of the blower fan 5 by 5 rpm per second. When the operating current still increases, even after control of the rotational number at level 2, and the operating current exceeds a reference value of 14 A to reach level 3, and then the control device 50 reduces the rotational number of the blower fan 5 by 10 rpm per second. When the operating current still increases, even after the control of the rotational number at level 3, and exceeds a reference value of 14.5 A to reach level 4, then the control device 50 reduces the rotational number of the blower fan 5 by 20 rpm per second.

With such control for rotation of the blower fan 5, the operating current decreases. When the operating current is still in level 4 higher than 14 A, the control device 50 reduces the rotational number of the blower fan 5 by 20 rpm per second. On the other hand, when the operating current becomes 14 A or below to reach level 3, the rotational number of the blower fan 5 is controlled so as to be reduced by 10 rpm per second, and when the operating current is 13.5 A or below to reach level 2, the rotational number of the blower fan 5 is controlled to be reduced by 5 rpm per second. When the operating current is 13 A or below to reach level 1, the current rotational number of the blower fan 5 is maintained.

In a process where the operating current increases, when the detected operating current exceeds a minimum reference value (13 A) in the ascending change of the operating current, a decreasing degree in the rotational number of the blower fan 5 is varied in a stepwise manner depending on the operating current. When the operating current is high, overcurrent occurs and it is more likely to stop the operation. Hence, by decreasing the rotational number of the blower fan 5 more and more, as the operating current is higher, it is possible to promptly restrict increase in the operating current to thereby prevent overcurrent.

Moreover, in a process where the operating current decreases, when the detected operating current becomes a minimum reference value (12.5 A) or below in the descending change of the operating current, that is, the operating current becomes a normal state, the rotational number of the blower fan 5 is returned to the initial rotational number. At this time, as described above, the rotational number of the blower fan 5 is increased gradually to the initial rotational number.

Instead of the blower fan 5, the rotation of the exhaust fan 6 may be controlled. The control device 50 increases the rotational number of the exhaust fan 6 in a stepwise manner depending on the detected operating current. Note that, the blower fan 5 is controlled at the fixed rotational number. As shown in FIG. 7, level 1 to level 4 are set based on a reference value. When the operating current becomes high, the rotational number is increased by the determined number depending on each level. When the operating current becomes low, the rotational number is reduced by the determined number depending on each level.

When the operating current reaches level 1, the control device 50 maintains the current rotational number of the exhaust fan 6. When the operating current still exceeds a reference value of 13.5 A to reach level 2, the control device 50 increases the rotational number of the blower fan 6 by 5 rpm per second. When the operating current still exceeds a reference value of 14 A to reach level 3 even after the control of the rotational number at level 2, then the control device 50 increases the rotational number of the exhaust fan 6 by 10 rpm per second. When the operating current still exceeds a reference value of 14.5 A to reach level 4 even after the control of the rotational number at level 3, then the control device 50 reduces the rotational number of the exhaust fan 6 by 20 rpm per second.

With such control for rotation of the exhaust fan 6, the operating current decreases. When the operating current is still in level 4 higher than 14 A, the control device 50 increases the rotational number of the exhaust fan 6 by 20 rpm per second. On the other hand, when the operating current becomes 14 A or below to reach level 3, the rotational number of the exhaust fan 6 is controlled to be increased by 10 rpm per second, and when the operating current is 13.5 A or below to reach level 2, the rotational number of the exhaust fan 6 is controlled to be increased by 5 rpm per second. When the operating current is 13 A or below to reach level 1, the current rotational number of the exhaust fan 6 is maintained.

Moreover, in a process where the operating current decreases, when the operating current becomes a minimum reference value (12.5 A) or below in the descending change of the operating current (the operating current becomes a normal state), the rotational number of the exhaust fan 6 is returned to the initial rotational number. At this time, the rotational number of the exhaust fan 6 is preferably increased gradually to the initial rotational number.

Furthermore, the control for the rotation of the exhaust fan 6 and the control for the rotation of the blower fan 5 may be performed in combination. When the operating current exceeds a reference value, firstly, the rotational number of the exhaust fan 6 is increased depending on a level with respect to the reference value of its operating current. When the rotational number of the exhaust fan 6 reaches the maximum rotational number, the rotational number of the blower fan 5 is decreased depending on a level with respect to the reference value of its operating current.

As described above, the higher the operating current is, the greater the change in the rotational number of the blower fan 5 or the exhaust fan 6 becomes, thus the effect by the decrease in the operating current can be enhanced. As a result, it is possible to prevent the overcurrent reliably and to enable continuous operation.

Meanwhile, load variation in the compressor 2 is likely to occur right after the start of operation when the operation is not stable yet. Hence, as a third embodiment, in accordance with an operation time, a reference value of the operating current is changed. The control device 50 controls the rotation of the blower fan 5 and the exhaust fan 6 based on a first reference value until a fixed time has elapsed from start of operation, and controls the rotation of the blower fan 5 and the exhaust fan 6 based on a second reference value after the fixed time has elapsed. The first reference value is lower than the second reference value.

Figure 8:
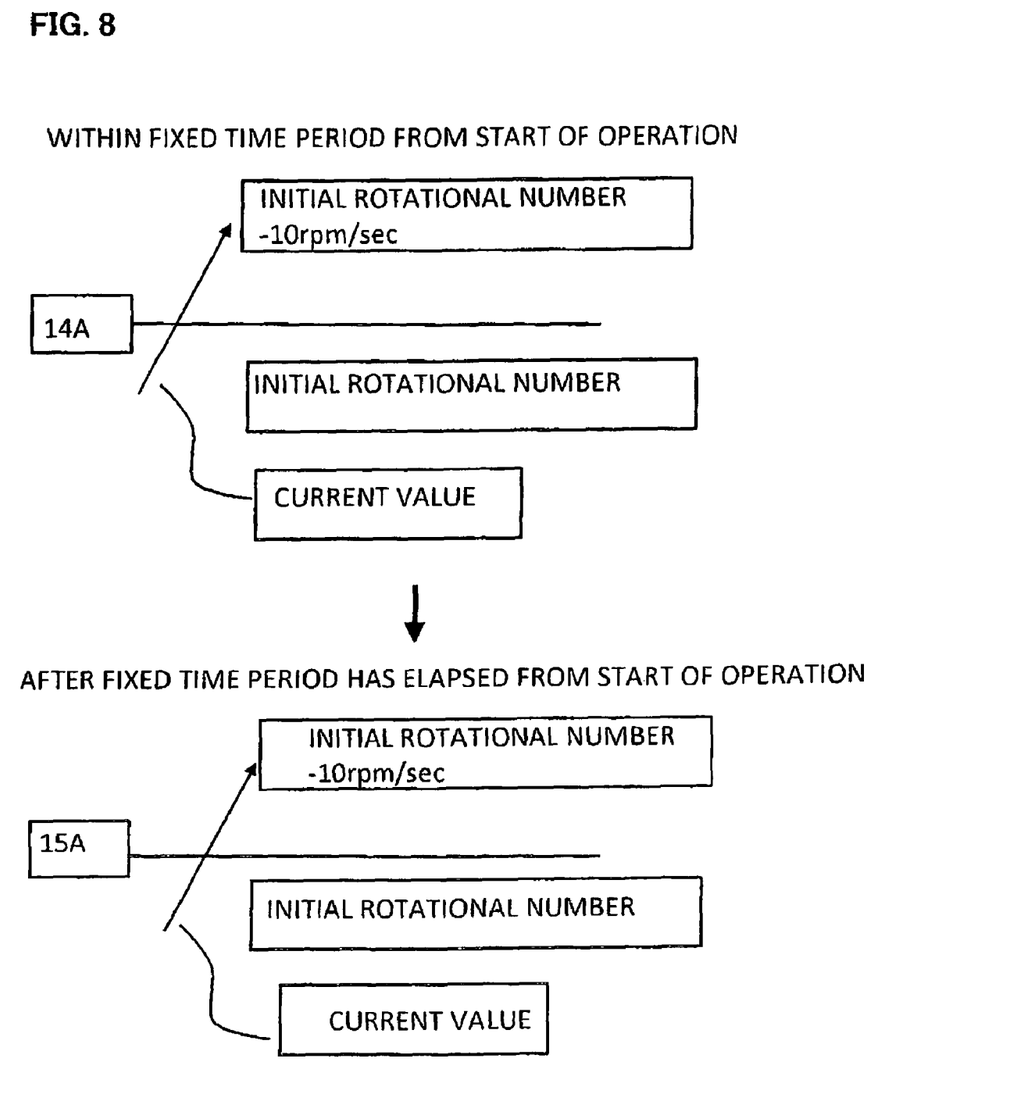
FIG. 8 is a view showing a change in the rotational number of the blower fan when the operating current exceeds a reference value that is set depending on an operation time.

Upon start of cooling operation or dehumidifying operation, the blower fan 5 and the exhaust fan 6 are driven at the initial rotational number (500 rpm). The control device 50 decreases the rotational number of the blower fan 5 based on the first and the second reference values. The rotational number of the exhaust fan 6 is fixed. As shown in FIG. 8, until the fixed time has elapsed from start of operation, the control device 50 monitors change in the operating current based on the first reference value. When the operating current exceeds the first reference value (14 A), the control device 50 decreases the rotational number of the blower fan 5 by 10 rpm per second. The fixed time is set, for example, for one minute. When the operating current becomes the first reference value or below before the fixed time has elapsed, the rotational number of the blower fan 5 is returned to the initial rotational number.

After the fixed time has elapsed, the control device 50 changes from the first setting value to the second setting value to monitor the change in the operating current. When the operating current exceeds the second setting value (15 A), the control device 50 reduces the rotational number of the blower fan 5 by 10 rpm per second. When the operating current is decreased to reach the second reference value or below, the rotational number of the blower fan 5 is returned to the initial rotational number.

Note that, the rotational number of the blower fan 5 is decreased by the same number before and after the fixed time period, but this number may be different. For example, a degree of reducing in the rotational number before the fixed time period has elapsed is set to be greater than the reducing degree in the rotational number after the fixed time period has elapsed. During the fixed time period right after start of operation, load variation is so significant that the operating current is likely to increase, and by making the degree of reducing in the rotational number during this time greater, it is possible to promptly decrease the operating current.

Instead of the blower fan 5, the rotation of the exhaust fan 6 may be controlled. Similarly to the above, the control device 50 controls the rotation of the exhaust fan 6 based on a first reference value within a fixed time period from start of operation, and controls the rotation of the exhaust fan 6 based on a second reference value after the fixed time period has elapsed. The rotational number of the blower fan 5 is fixed.

Furthermore, the rotation of the blower fan 5 and the exhaust fan 6 may be controlled. When the operating current exceeds a reference value, the control device 50 firstly increases the rotational number of the exhaust fan 6. When the rotational number of the exhaust fan 6 reaches the maximum rotational number, the rotational number of the blower fan 5 is reduced. The reference value is changed before and after the fixed time period similarly to the above.

As described above, by setting the reference value right after start of operation lower, it is possible to promptly decrease the operating current in an early stage when the overcurrent is likely to occur. As a result, the overcurrent can be less likely to occur.

As a fourth embodiment, while the rotational number of the blower fan 5 and the exhaust fan 6 is changed in a stepwise manner depending on change in the operating current, a reference value is changed before and after a fixed time period.

Within a fixed time period from start of cooling operation or dehumidifying operation, the control device 50 reduces the rotational number of the blower fan 5 in a step wise manner based on a plurality of first reference values, and when the operating current becomes a normal state, the rotational number of the blower fan 5 is returned to the initial rotational number. Alternatively, the rotational number of the exhaust fan 6 is increased in a stepwise manner, and when the operating current becomes a normal state, the rotational number of the exhaust fan 6 is returned to the initial rotational number.

After the fixed time period has elapsed, the control device 50 changes the plurality of first reference values to the plurality of second reference values, and reduces the rotational number of the blower fan 5 in a stepwise manner based on the plurality of second reference values, and when the operating current becomes normal, returning the rotational number of the blower fan 5 to the initial rotational number. Alternatively, the rotational number of the exhaust fan 6 is increased in a stepwise manner, and when the operating current becomes normal, the rotational number of the exhaust fan 6 is returned to the initial rotational number.

Figure 9:
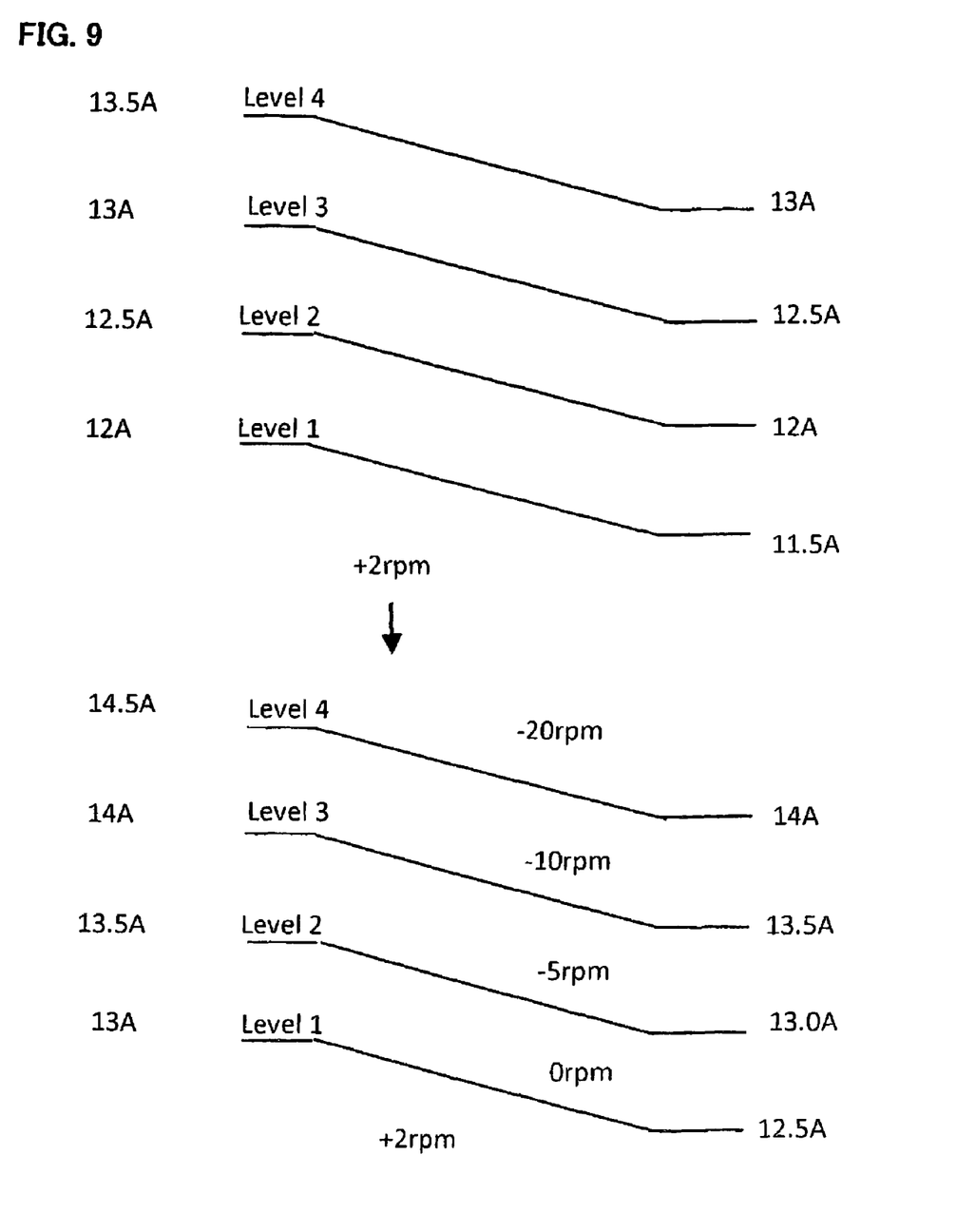
FIG. 9 is a view showing a relation between a plurality of reference values that are set depending on the operation time and a degree of change in the rotational number.

As shown in FIG. 9, the plurality of first setting values are set until the fixed time period has elapsed, and after the fixed time period has elapsed, the plurality of second setting values are set. The second setting values are set higher than the first setting values. In addition, each setting value has hysteresis, and a reference value in the ascending change of the operating current is set to be higher than the reference value in the descending change.

When the operating current changes, the control device 50 increases/reduces the rotational number of the blower fan 5 based on each setting value depending on an elapsed time from start of operation. Moreover, instead of the blower fan 5, the rotation of the exhaust fan 6 may be controlled. Furthermore, the exhaust fan 6 and the blower fan 5 may be controlled in combination. In either, specific operation of the control device 50 is similar to the operation combining the second embodiment and the third embodiment.

As described above, in accordance with the change in the operating current and an operation time, the control device 50 controls the rotation of the exhaust fan 6 and the blower fan 5 with finer control, thus making it possible to prevent the occurrence of overcurrent, while maintaining efficiency of a refrigerating cycle. Accordingly, in the beginning of the start of the operation when the operation is unstable, the control device can carry out stable continuous operation promptly while preventing stop of operation due to overcurrent.

Note that, the present invention will not be limited to the above described embodiments, and many modifications and alterations can be certainly made to the embodiments within the scope of the present invention. In the second and fourth embodiments, when exceeding a setting value, the rotational number of each fan is increased/reduced depending on a change rate of a current value. That is, the change rate is calculated from change in the operating current for a predetermined time, and when the change rate is high, the rotational number of the blower fan is reduced greatly, and when the change rate is low, the rotational number is reduced slightly. Furthermore, in a case where the rotational number of the exhaust fan is controlled, when the change rate is high, the rotational number is increased largely, and when the change rate is low, the rotational number is increased slightly.

Alternatively, the rotational number of the blower fan and the exhaust fan may be controlled simultaneously. That is, when the operating current exceeds a reference value, the control device reduces the rotational number of the blower fan and simultaneously increases the rotational number of the exhaust fan. Thereby, the operating current can be increased more promptly.

Note that, the decreasing number from level 1 to level 4 in the rotational number of the blower fan may be constructed so as to allow a wait-and-see stance for the operating current; 0 rpm at level 1, 10 rpm at level 2, 5 rpm at level 3 and 20 rpm at level 4, where the decreasing number in level 3 is set lower than the decreasing number in level 2. The similar method may be applied to a case when the exhaust fan is controlled.

Alternatively, in a process when the operating current decreases, the decreasing number in the rotational number of the blower fan may be set to 0. For example, when the operating current reaches from level 4 to level 3, the control for reducing the rotational number of the blower fan is stopped and the current rotational number is maintained. When the operating current further decreases to become normal, the initial rotational number may be gradually recovered. As a result, when the operating current decreases and becomes normal, a time until the rotational number of the blower fan is returned to the initial rotational number can be reduced. The similar method may be applied to a case where the exhaust fan is controlled.

What is claimed is:

1. An integral type air conditioner including, in a cabinet, a compressor, a condenser, an evaporator, an exhaust fan and a blower fan for exhausting exhaust heat generated from the condenser by the exhaust fan from an exhaust port through a duct fitted to the exhaust port of the cabinet to outside and blowing air to the evaporator by the blower fan to blow generated cool air into a room during cooling operation, wherein a current detector for detecting an operating current supplied during operation and a control device for controlling the compressor, the exhaust fan and the blower fan are provided, the control device determining the initial rotation number of the exhaust fan and the blower fan when operating is started and controlling rotation of the exhaust fan or the blower fan depending on the detected operating current so as not to cause overcurrent during cooling operation.

2. The integral type air conditioner according to claim 1, wherein the control device increases the rotational number of the exhaust fan when the operating current exceeds a reference value.

3. The integral type air conditioner according to claim 2, wherein the control device changes the rotational number of the exhaust fan in a stepwise manner depending on change in the operating current.

4. The integral type air conditioner according to claim 3, wherein the control device increases change in the rotational number, as the operating current becomes higher.

5. The integral type air conditioner according to claim 2, wherein a reference value within a fixed time period from start of operation is set lower than a reference value after the fixed time period has elapsed.

6. The integral type air conditioner according to claim 2, wherein the compressor is driven at a fixed rotational number during operation.

7. The integral type air conditioner according to claim 1, wherein the control device reduces the rotational number of the blower fan when the operating current exceeds a reference value.

8. The integral type air conditioner according to claim 7, wherein the control device changes the rotational number of the blower fan in a stepwise manner depending on change in the operating current.

9. The integral type air conditioner according to claim 8, wherein the control device increases change in the rotational number, as the operating current becomes higher.

10. The integral type air conditioner according to claim 7, wherein the compressor is driven at a fixed rotational number during operation.

11. An integral type air conditioner including, in a cabinet, a compressor, a condenser and an evaporator for exhausting exhaust heat generated from the condenser by an exhaust fan through a duct to outside and blowing air to the evaporator by a blower fan to blow generated cool air into a room during cooling operation, wherein a current detector for detecting an operating current supplied during operation and a control device for controlling the compressor, the exhaust fan and the blower fan are provided, the control device controlling rotation of the exhaust fan or the blower fan depending on the detected operating current so as not to cause overcurrent, and the control device increases the rotational number of the exhaust fan when the operating current exceeds a reference value, and reduces the rotational number of the blower fan when the rotational number of the exhaust fan reaches a set maximum rotational number.

12. The integral type air conditioner according to claim 11, wherein the control device changes the rotational number of the exhaust fan or the blower fan in a stepwise manner depending on change in the operating current.

13. The integral type air conditioner according to claim 12, wherein a reference value in ascending change of the operating current is set higher than a reference value in descending change of the operating current.

14. The integral type air conditioner according to claim 12, wherein the control device increases change in the rotational number, as the operating current becomes higher.

15. The integral type air conditioner according to claim 11, wherein a reference value within a fixed time period from start of operation is set lower than a reference value after the fixed time period has elapsed.

16. The integral type air conditioner according to claim 11, wherein the compressor is driven at a fixed rotational number during operation.

17. An integral type air conditioner including, in a cabinet, a compressor, a condenser and an evaporator for exhausting exhaust heat generated from the condenser by an exhaust fan through a duct to outside and blowing air to the evaporator by a blower fan to blow generated cool air into a room during cooling operation, wherein
   a current detector for detecting an operating current supplied during operation and
   a control device for controlling the compressor, the exhaust fan and the blower fan are provided, the control device controlling rotation of the exhaust fan or the blower fan depending on the detected operating current so as not to cause overcurrent, and the control device increases the rotational number of the exhaust fan when the operating current exceeds a reference value and changes the rotational number of the exhaust fan in a stepwise manner depending on change in the operating current, and a reference value in ascending change of the operating current is set higher than a reference value in descending change of the operating current.

18. An integral type air conditioner including, in a cabinet, a compressor, a condenser and an evaporator for exhausting exhaust heat generated from the condenser by an exhaust fan through a duct to outside and blowing air to the evaporator by a blower fan to blow generated cool air into a room during cooling operation, wherein
   a current detector for detecting an operating current supplied during operation and
   a control device for controlling the compressor, the exhaust fan and the blower fan are provided, the control device controlling rotation of the exhaust fan or the blower fan depending on the detected operating current so as not to cause overcurrent, and the control device decreases the rotational number of the blower fan when the operating current exceeds a reference value and changes the rotational number of the blower fan in a stepwise manner depending on change in the operating current, and a reference value in ascending change of the operating current is set higher than a reference value in descending change of the operating current.

19. An integral type air conditioner including, in a cabinet, a compressor, a condenser and an evaporator for exhausting exhaust heat generated from the condenser by an exhaust fan through a duct to outside and blowing air to the evaporator by a blower fan to blow generated cool air into a room during cooling operation, wherein
   a current detector for detecting an operating current supplied during operation and
   a control device for controlling the compressor, the exhaust fan and the blower fan are provided, the control device controlling rotation of the exhaust fan or the blower fan depending on the detected operating current so as not to cause overcurrent, and the control device decreases the rotational number of the blower fan when the operating current exceeds a reference value, and a reference value within a fixed time period from start of operation is set lower than a reference value after the fixed time has elapsed.

* * * * *